Dec. 11, 1956 A. C. LINDNER 2,773,715

HOOD LATCH

Filed Oct. 22, 1954 8 Sheets-Sheet 1

Inventor
Adam C. Lindner
by Parker & Carter
Attorneys

Inventor
Adam C. Lindner
by Parker & Carter
Attorneys

HOOD LATCH

Inventor
Adam C. Lindner
by Parker & Carter

Dec. 11, 1956 A. C. LINDNER 2,773,715

HOOD LATCH

Filed Oct. 22, 1954 8 Sheets-Sheet 4

Inventor
Adam C. Lindner
by Parker & Carter
Attorneys

Dec. 11, 1956 A. C. LINDNER 2,773,715

HOOD LATCH

Filed Oct. 22, 1954 8 Sheets-Sheet 5

Inventor
Adam C. Lindner
by Parker & Carter
Attorneys

Inventor
Adam C. Lindner
by Parker & Carter
Attorneys

Inventor
Adam C. Lindner by Parker & Carter
Attorneys

Dec. 11, 1956 A. C. LINDNER 2,773,715

HOOD LATCH

Filed Oct. 22, 1954 8 Sheets-Sheet 8

Inventor
Adam C. Lindner by Parker & Carter
Attorneys

United States Patent Office 2,773,715

Patented Dec. 11, 1956

2,773,715

HOOD LATCH

Adam C. Lindner, Chicago, Ill., assignor to Chicago Forging and Manufacturing Company, Chicago, Ill., a corporation of Delaware Application October 22, 1954, Serial No. 463,872

4 Claims. (Cl. 292—252)

This invention relates to an improvement in latching or locking means and has for one object a latch mechanism useable with automobiles.

Another purpose is to provide a hood latch which may be applied to alligator-type automobile hood closures.

Another purpose is to provide a hood latch whereby a hood closure may be secured to a hood at a variety of positions of the hood closure in relation to the hood.

Another purpose is to provide a hood latch assembly which shall be simple in construction and economical to manufacture.

Other purposes will appear from time to time in the course of the specification and drawing.

The present application is a continuation in part of my co-pending application Serial No. 416,544, filed March 16, 1954, for Hood Latch.

The invention is illustrated more or less diagrammatically in the accompanying drawings, wherein.

Like parts are indicated by like symbols throughout the specification and drawings.

Figures 1, 2:
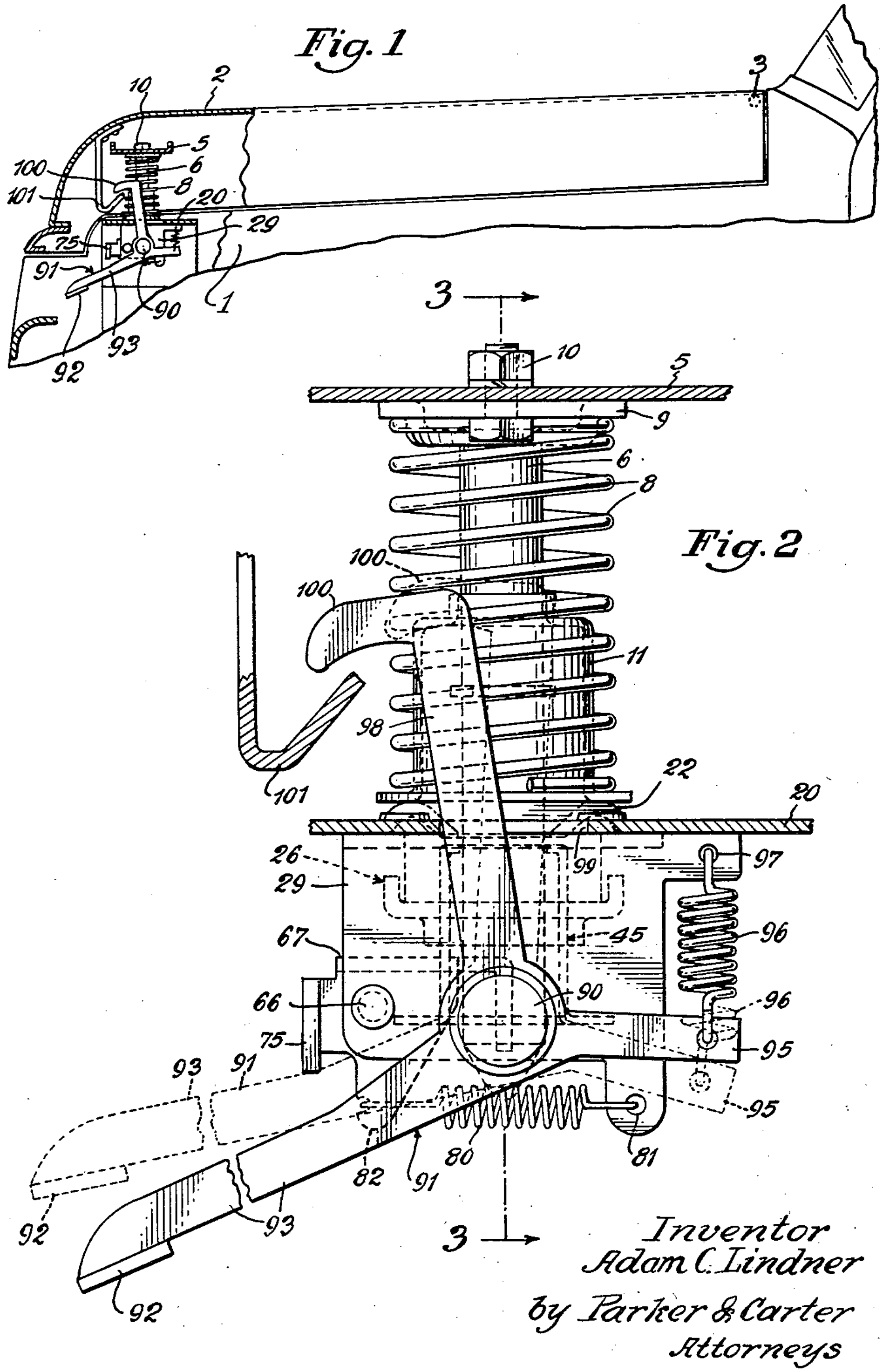
Figure 1 is a side view, in partial cross-section of the invention as installed, for example, in a hood closure and hood of an automobile.
Figure 2 is a side view, in partial cross-section and on an enlarged scale.

Referring to Figure 1, a hood or forward portion of an automobile is generally indicated at 1. A hood closure is generally indicated at 2. It will be understood that the alligator type hood referred to above is of the type which may be generally pivoted or hinged, for example, as illustrated at 3 in Figure 1. A spring or similar means (not shown) may be associated with the hood 1 and closure 2 adjacent pivot point 3 to aid in raising the closure and separating the below-described keeper and latch assemblies.

Referring now to Figure 2, the numeral 5 indicates a plate or similar member which may be secured or may be a part of the hood closure 2. Plate 5 carries a keeper member 6. Surrounding the keeper 6 is a spring 8 which may be held in position by a top cage member 9 secured or clamped against plate 5 as by the nut and bolt connection 10, and a bottom cage member 11. The cage member 11 has an inwardly bent wall portion 12 which generally surrounds and is adjacent to the keeper 6.

Figure 3:
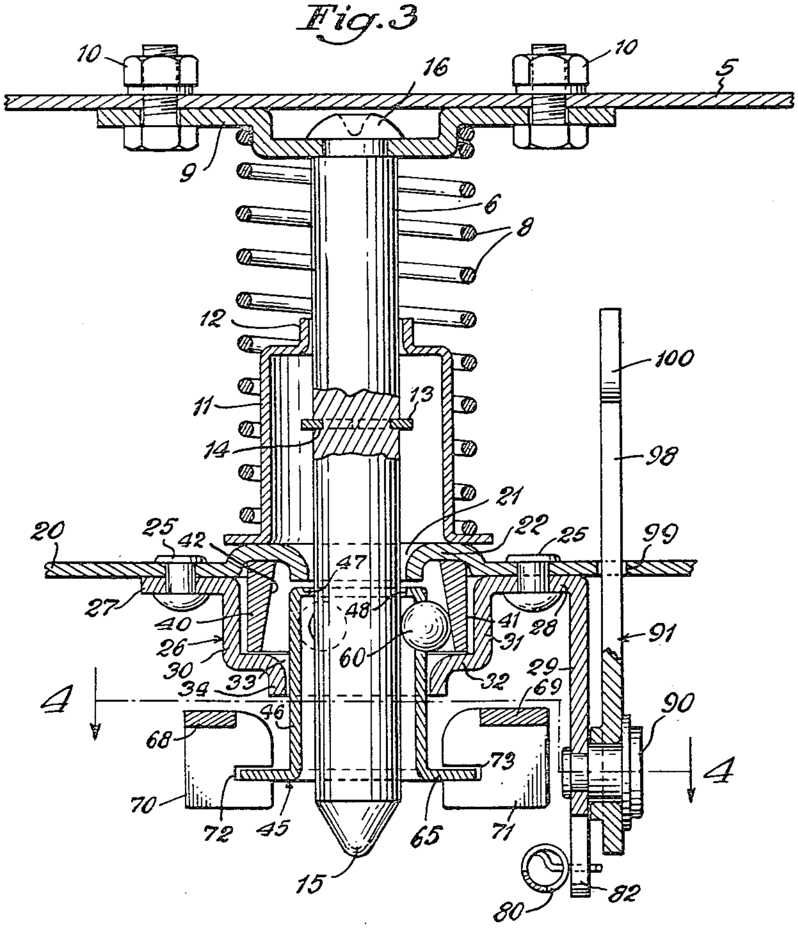
Figure 3 is a view taken on the line 3—3 of Figure 2.

The keeper 6, which may be cylindrical in cross-section, has a ring 13 secured in a generally circumferential groove 14 therein at a point spaced from the plate 5. As best seen in Figure 3, the ring 13 extends outwardly from the keeper 6 a sufficient distance to be contacted by the inwardly offset portion 12 and thus to retain the cage member 11 in position on the keeper 6 when the hood closure is separated from the hood. The ring 13 may be of the type generally known as a split ring. It will be realized that the ring 13 could be positioned at a variety of points on the keeper 6. While I prefer the relationship of the parts as shown, the keeper 6 could be of lesser extension, or the ring 13 could be positioned at a point closer to the keeper tip 15 to permit the keeper to retract entirely into the cage 11 upon release, if desired. The provision of a cylindrical rod-like, parallel-sided keeper escapes the necessity of forming an enlargement thereon as required in prior blade-type latches. The keeper may be quickly assembled by sliding the spring 8 and cup 11 thereon and thereafter setting the ring 13 in the groove 14. The cup and spring may be similarly removed and replaced without separating the keeper from the plate 9.

The keeper 6, as above described, may be circular in cross-section and may be of substantial linear extension. It may have the pointed or conical outer end 15 and may be secured to the top spring retaining member 9 as by the bolt or rivet 16.

Figures 5, 6, 7:
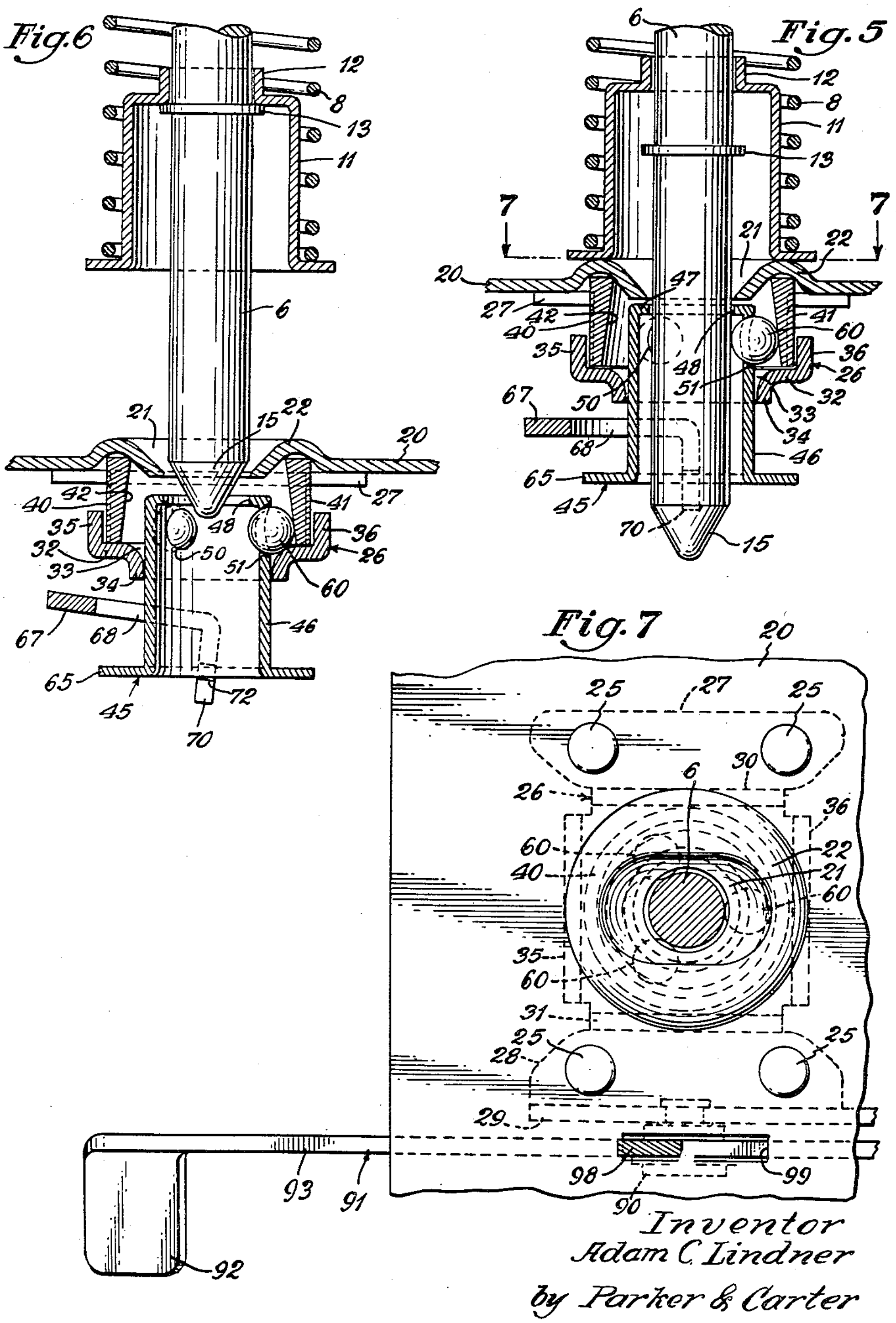
Figure 5 is a detail view, in partial cross-section, of the latching mechanism illustrated in Figure 3 and showing the parts in latching position.
Figure 6 is a view similar to that of Figure 5, showing the parts in unlatched position.
Figure 7 is a view taken on line 7—7 of Figure 5.

The hood, which may have secured thereto a latch plate 20, may have generally centrally located thereon an aperture 21. The aperture 21 may be surrounded by a generally upwardly offset and downwardly inwardly bent portion 22 of the plate 20. As best seen from a view of Figures 3, 5 and 7, the upset portion 22 of the plate 20 may have its inner portions formed in one manner, as in Figure 3, adjacent the sides of the aperture 21 and may have them formed in a different manner, as seen in Figure 5, adjacent the forward and aft edges of the aperture 21, considering the parts as illustrated in the drawings. Thus, while the aperture 21 may be generally circular, the plate portion 22 may form the generally elongated guide for the keeper 6, as best seen in Figure 7.

Secured to the plate 20, as by the rivet connections 25, and for example to the bottom face of plate 20, is a latch housing member generally indicated at 26. The bracket member 26 may have the outwardly oppositely disposed attaching flanges 27, 28 through which the rivet connections 25 may extend. As best seen in Figures 3 and 7 the flanges 27, 28 extend to either side of the aperture 21. The flange 28 may have the downwardly, generally vertically depending side wall or plate portion 29.

The housing 26 may have downwardly depending from the flanges 27, 28 a pair of generally vertical side walls 30, 31 which may in turn carry the generally horizontally disposed bottom wall 32 which is disposed generally beneath and spaced from the aperture 21. The bottom wall 32 has the aperture 33 therein, the aperture 33 being somewhat larger than the aperture 21 and generally axially in alignment therewith. The bottom wall 32 may have a downwardly bent portion 34 surrounding the aperture 33. The horizontal bottom wall 32 may have upwardly bent portions 35, 36 along its side edges, as best illustrated in Figures 5 and 6.

It will be observed that the upset portions 22 of the plate 20, the sidewalls 26, 31, 35 and 36 and the bottom wall 32 together form a retaining and positioning cage for a ring 40. The ring 40 may have a generally vertical outer circumferential face 41 and an inwardly upwardly conical circumferential wall 42.

Arranged for positioning and slidable movement within the aperture 33 is the generally cylindrical hollow sleeve member generally indicated at 45. The sleeve 45 has the generally cylindrical side wall 46. The wall 46 has adjacent its upper end a generally annular inwardly bent flange portion 47, the inner end of which defines an opening or aperture 48 of sufficient diameter to permit the passage therethrough of the keeper 6. The generally cylindrical wall 46 has a series of circumferentially spaced apertures 50 adjacent its upper edges. The wall 46 has its generally inwardly conical edges 51 surrounding the aperture 50.

As best seen in Figures 3, 5 and 6 the upper portion of the cylindrical wall 46, which extends upwardly through the aperture 33 and is therefore positioned between the plate 20 and the bottom wall 32 of the housing 26, forms with the ring 40 a case for a plurality of balls 60. The aperture 50 is of less diameter than the balls 60 but of sufficient diameter to permit a portion of the balls 60 to extend inwardly toward the axis of the hollow sleeve 45. While I illustrate three apertures 50 in the sleeve 45, it will be realized that the number of such apertures may be varied without departing from the nature and scope of my invention. The members 46, 50, 60 and 40 form, in effect, a race of balls.

As best seen in Figure 6 the balls 60 are of a diameter sufficient to permit the balls 60 to be in contact with the inwardly upwardly conical inner circumferential wall 42 of the ring 40. When the keeper 6 is separated from the latching assembly the sleeve 45 will have been temporarily forced downwardly as below described. The balls 60, however, since they extend outwardly from the sleeve 45, are thereby brought to rest upon the bottom wall 32 and thus serve to retain the sleeve 45 in position in the aperture 33.

Figure 4:
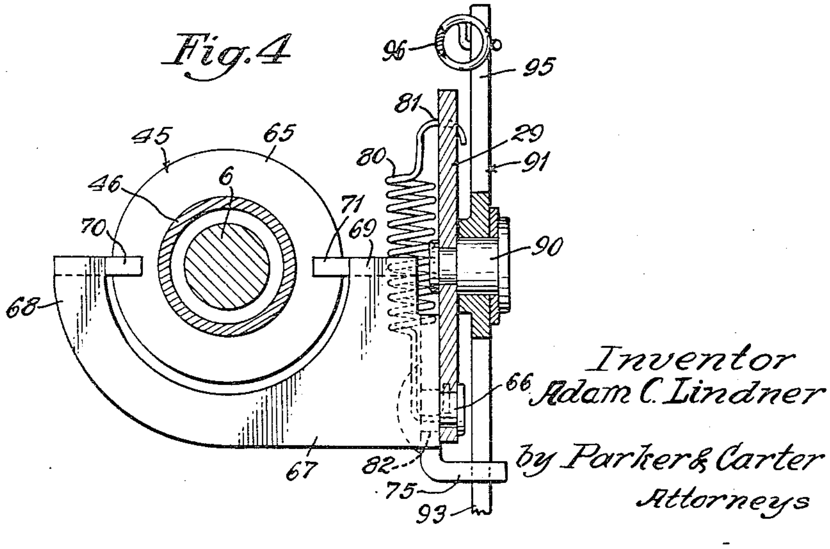
Figure 4 is a view taken on a line 4—4 of Figure 3.

The wall 46 of the sleeve 45 carries adjacent its bottom edge the generally annular outwardly extending flange 65. Referring now to Figure 4, the downwardly depending plate portion 29 may have pivoted thereon, as at 66, a latch releasing member 67. The member 67 may have a pair of arms 68, 69 which may, in turn, carry the vertically extending portions 70, 71. The portions 70, 71 may have, respectively, the grooves 72, 73 adapted to receive portions of the flange 65 and to form an actuating connection thereby between the releasing member 67 and the sleeve 45. It will be observed that the grooves 72, 73 constitute with the flange 65 a lost-motion connection with the sleeve 45. The member 67 carries an abutment 75 which extends beyond the pivot 66 and which may be bent at right angles to provide a portion extending beyond the outer face of the plate portion 29 as indicated in the lower right-hand corner of Figure 4. Yielding means, such as at spring 80, may be secured to the plate 29 as at 81 and to a downwardly depending ear 82 on the releasing member 67. As best seen in Figure 2 the spring 80 is effective to urge the arms 68, 69 upwardly and thus to urge the balls 60 upwardly along the inner wall 42 of the ring 40 which, since the sleeve 45 rises generally vertically, cause the balls 60 to move inwardly toward the axis of the sleeve 45. Thus when a part of the circular portion of the keeper 6 is in general horizontal alignment with the balls 60, the keeper 6 will be gripped by the balls and thereby held in position. In this regard it will be observed that the spring 8, since it has been compressed between the plate 5 and the plate 20, is thus adapted to urge the keeper 6 upwardly through the apertures 48 and 21. Since such upward movement of the keeper 6 would tend to carry the balls 60 further upwardly along the wall 42 of the ring 40 and thus to force the balls inwardly against the keeper 6, it is seen that the spring 8 contributes also to the locking or holding action of the balls 60 against the keeper 6.

Referring now to Figures 2 and 3, it will be observed that the plate 29 carries a type of stub shaft 90. Rotatably or pivotally mounted on the shaft 90 is a safety latch and latch-operating lever generally indicated at 91. The lever 91 may have a manually operable grip portion 92 adjacent the forwardly extending, as the parts are shown in the drawings, end of an arm 93. As best seen in Figure 1, the arm 93 extends a sufficient distance to place the grip 92 in position to be grasped by the operator from outside and in front of the hood 1. As best seen in Figure 4, the arm 93 underlies the abutment 75 on the latch-releasing arm 67. The member 91 has the arm 95 which extends beyond the pivot point 90 in a direction generally opposite from the arm 93. The arm 95 may have secured thereto yielding means such as at spring 96. The spring 96 has its opposite end secured to an upper portion of the plate 29 as at 97. As best seen in Figure 2, the spring 96 is thus adapted to urge the arm 93 downwardly out of contact and spaced from the abutment 75. The member 91 may have the generally upwardly directed safety latch arm 98 which may extend through a slot 99 in the plate 20, the slot 99 being of sufficient linear extension to permit the safety latch arm 98 to move therethrough, the edges of the slot 99, however, serving to act as limits for the movement of the arm 98 and since the arm 98 is rotatable with the operating arm 93, the edges of the slot 99 serve to limit also the movement of the arm 93. The arm 98 carries adjacent its upper end a hook or a safety latch portion 100. As best seen in Figures 1 and 2, the hood closure 2 may carry a generally inclined member 101. It will be observed that the safety latch hook portion 100 is generally downwardly curved along its upper forward edge. Thus the member 101, as the hood closure approaches the hood, will ride along the curved upper edge of the member 100 and thus will force it out of position, since the member 101 is arranged for a general vertical alignment with the member 100 when the member 100 is held in its forward position under the influence of the spring 96. After the member 101 has passed beyond the member 100, the spring 96 causes the member 100 to move forward and thereafter to overlie the member 101, as best seen in Figure 2.

Figure 8:
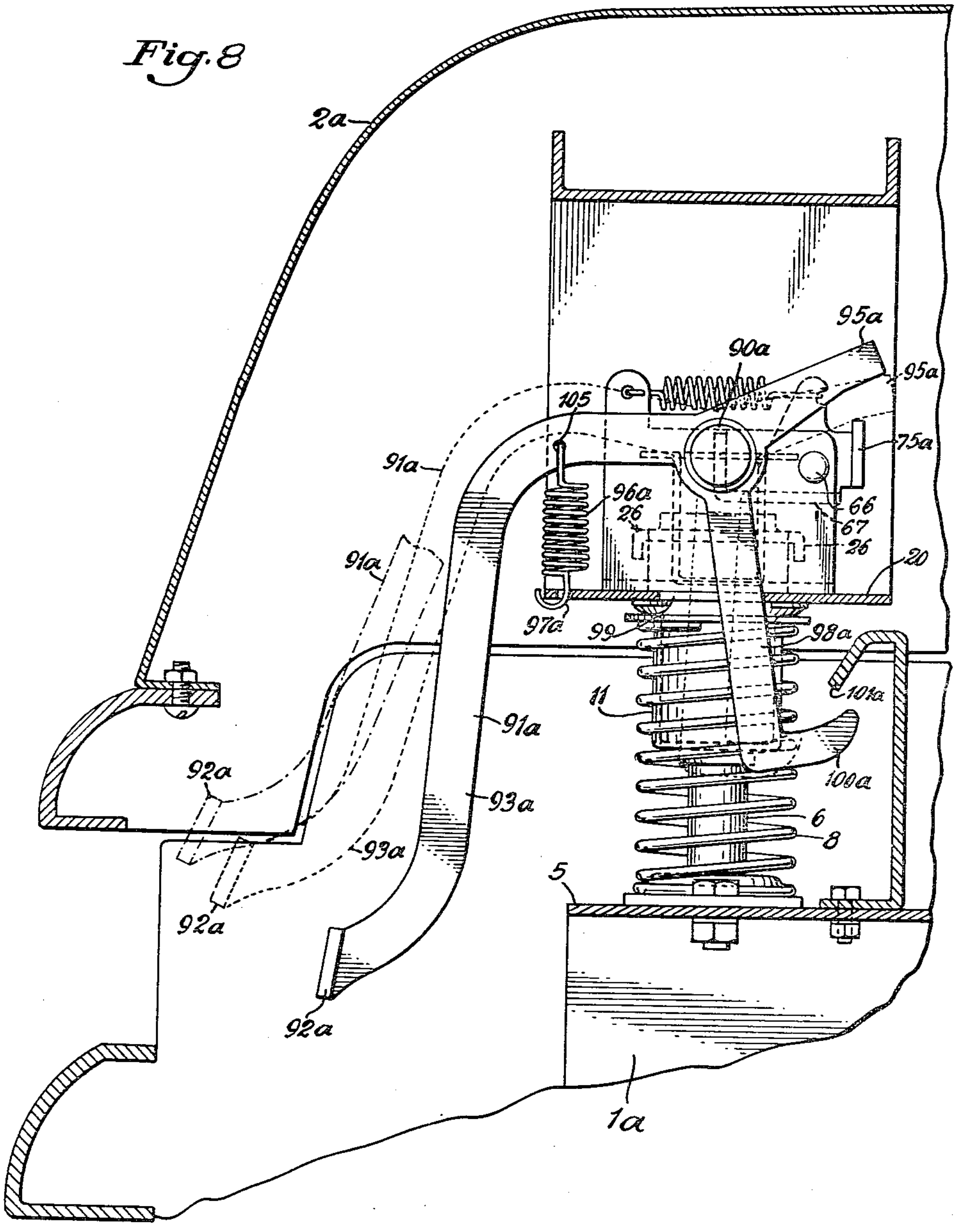
Figure 8 is a side view, in partial cross-section, and illustrating the invention as installed, for example, on the hood closure and hood of an automobile, the elements of the invention being reversed from the position shown in Figure 1.

In the variant form of my invention illustrated in Figure 8, the keeper plunger assembly is positioned on the hood, generally indicated at 1*a*, and the latching assembly is positioned on the hood closure generally indicated as 2*a*; that is to say, the two major assemblies of the structure of my invention are reversed in location. It will be observed, however, that all of the parts above described are essentially the same, with the exception of the latch operating and safety member 91, the variant form of which is generally indicated at 91*a* in the variant form of Figure 8. The safety latch portion generally indicated at 98*a* and 100*a* and the hook member cooperating therewith, generally indicated at 101*a*, are essentially similar to that described in relation to Figures 1–7. The forwardly extending arm 93 of Figures 1–7, however, has been elongated and generally downwardly bent, as illustrated in Figure 8 as at 93*a*, in order to place the hand-gripped portion 92*a* in the general position occupied by the grip 92 of the structure illustrated in Figures 1–7. A spring 96*a*, having the function of the spring 96 of the earlier figures may be secured at one end to the plate 20 as at 97*a* and may be secured at its opposite end to a generally horizontal portion of the arm 93a as at 105. The member 91a has an extension arm 95a extending beyond the pivot 90a a sufficient distance to overlie an abutment 75a which corresponds to the abutment 75 of Figures 1–7. It will be seen that forward movement of the arm 93a, as shown in dotted lines in Figure 8, causes the safety latch 100a to move forward or to the left as the parts are shown in Figure 8 and thus out of alignment with the hook 101a. A forward movement of the arm 93a causes also a downward movement, as indicated in dotted lines, of the arm 95a.

Figure 9:
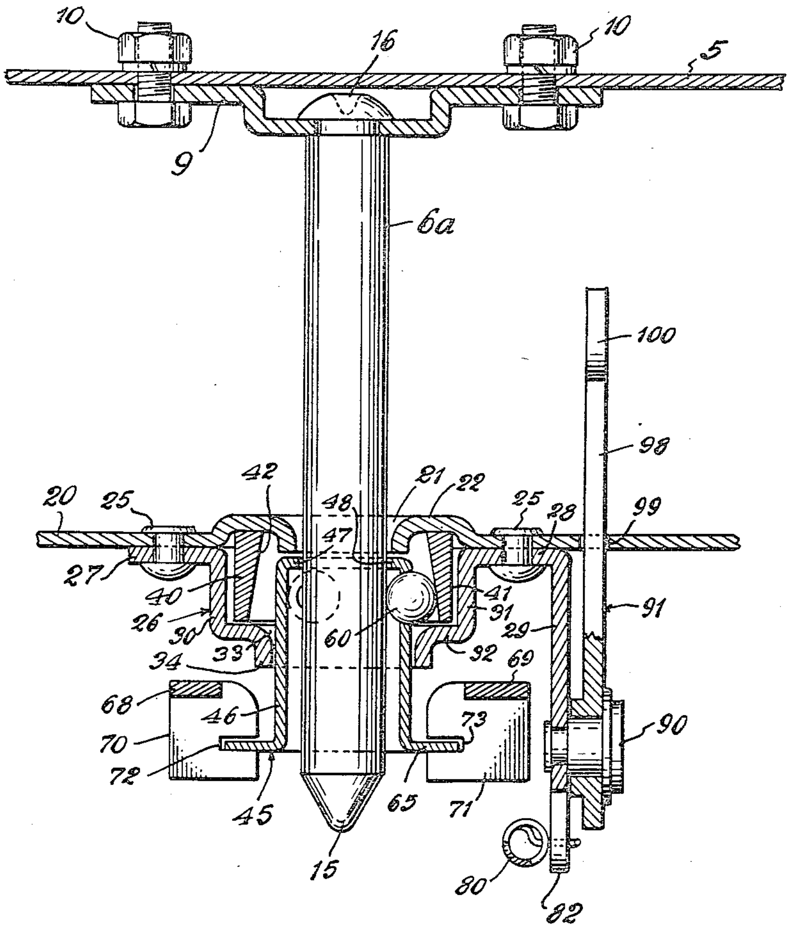
Figure 9 is a detail view illustrating a variant form of a part of my invention.

In the variant form of keeper mechanism illustrated in Figure 9, the spring 8, cup 11, and ring 13 are eliminated and the cylindrical keeper rod 6a is similar to the keeper 6, illustrated in the earlier figures. It will be understood that many of the hood closures presently in use are provided with means separate from the latch mechanism, which are effective to urge the closure upward or toward open position. Since the keeper illustrated herein does not have an enlarged or hook portion which must be held firmly against, for example, a latch bolt in order to prevent vibration and catching beneath the latch plate itself, it is feasible, in certain cases, to eliminate the elements 8, 11, and 13 without affecting the efficiency of my device.

Figure 10:
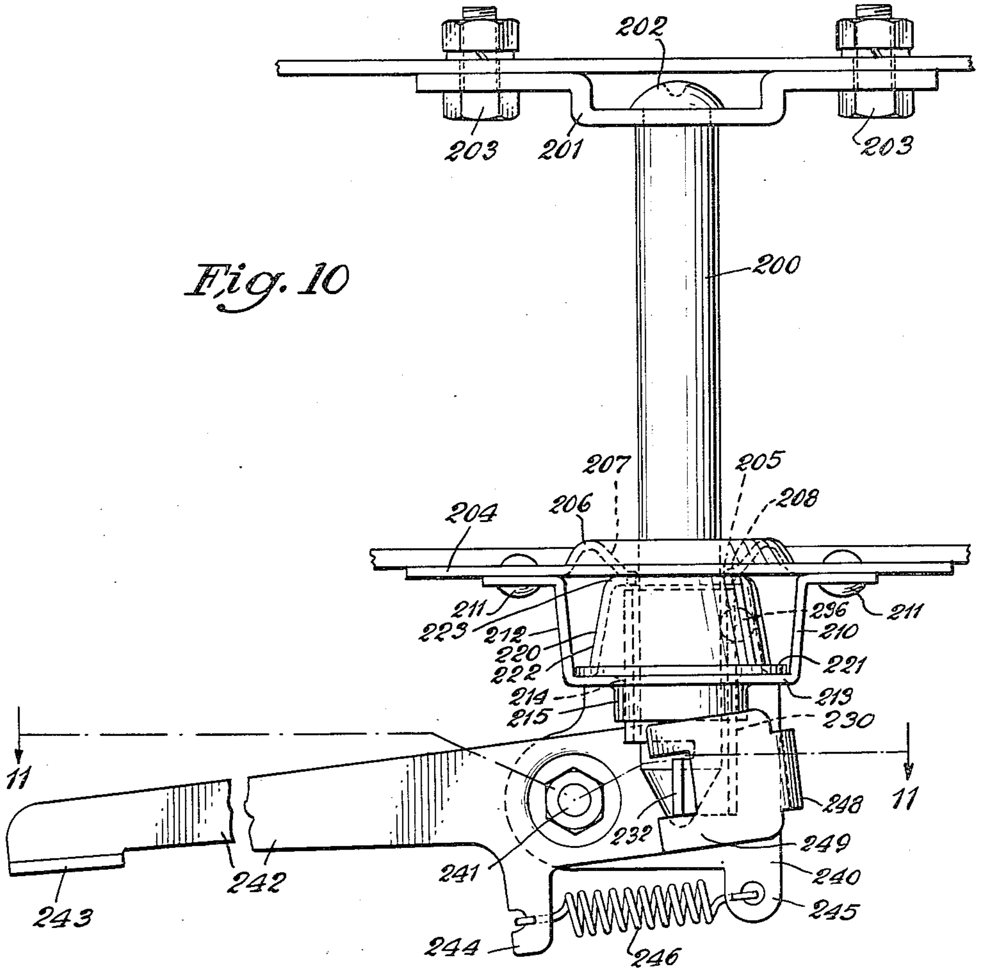
Figure 10 is a side view in partial cross-section of a variant form of my device.
Figure 11:
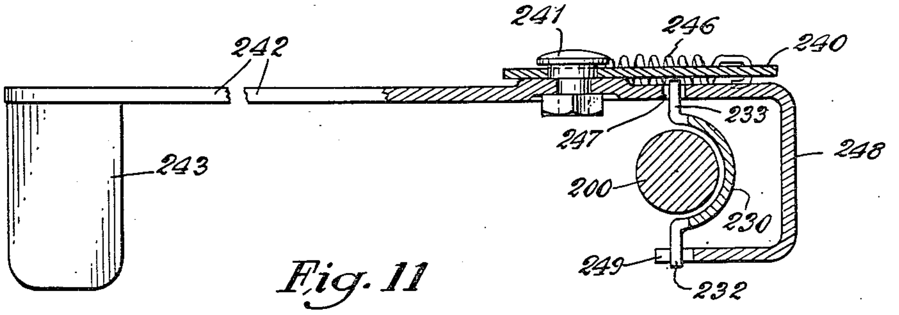
Figure 11 is a view taken on a line 11—11 of Figure 10.
Figures 12, 15:
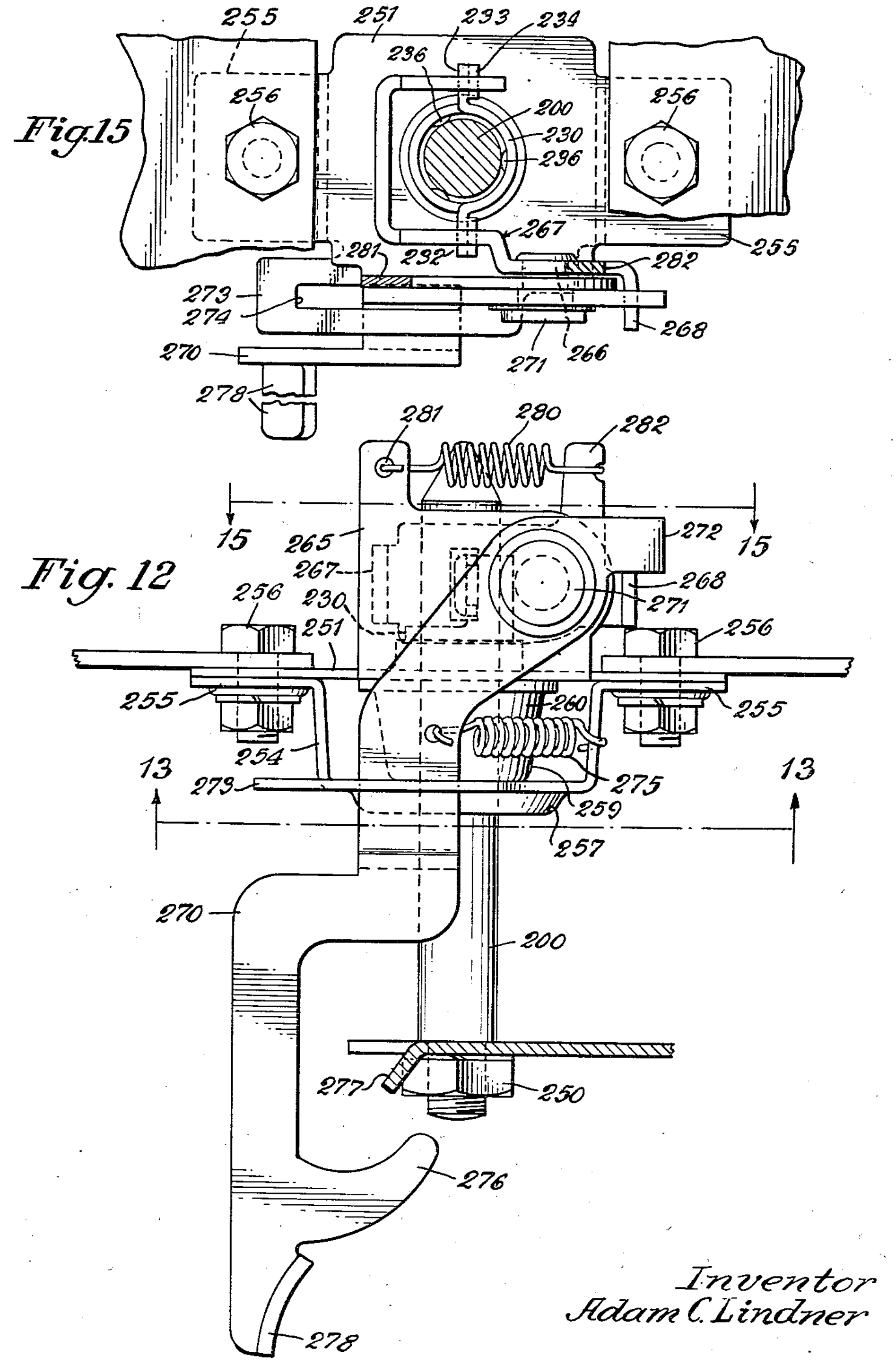
Figure 12 is a side view in partial cross-section of another variant form of my device.
Figure 15 is a view taken on a line 15—15 of Figure 12.
Figure 13:
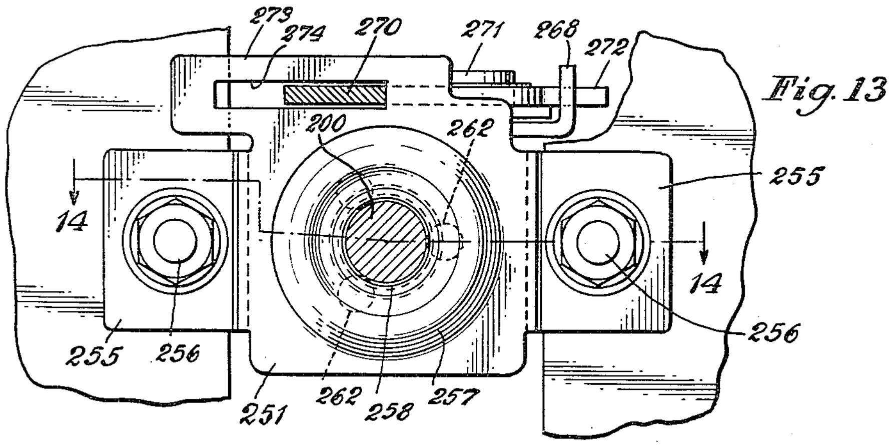
Figure 13 is a view taken on a line 13—13 of Figure 12.

Referring now to Figures 10 and 11, the numeral 200 generally indicates a pencil-like keeper member similar in construction to the keepers 6 and 6a of Figures 1 and 9. The keeper 200 may be secured to the hood closure of an automobile as by the plate 201, rivet 202, and securing means generally indicated at 203.

A latch plate 204 may be apertured as at 205, the aperture 205 being surrounded by a keeper-guiding element 206 which may comprise an upwardly offset portion of the plate 204 having the downwardly, inwardly inclined surface 207 immediately surrounding the aperture. Whereas the element 22 shown in Figures 1–9 has its forward and rearward inner wall portions so inclined, it will be seen that the element 206 is inclined entirely about the aperture 205. A generally cylindrical, downwardly depending edge 208 may be formed on the inclined keeper-guiding portion 207. It will be realized that the edge portion 208 defines the aperture 205, the diameter of which may be only slightly greater than that of the stem-like keeper 200.

The latch housing member 210 may be secured to the underface or, in other words, to the face opposite that approached by the keeper, of the plate 204, as by the securing means generally indicated at 211. The housing 210 may be generally circular and may have its side wall 212 slightly inclined, as shown. A bottom wall 213 of the member 210 is spaced from the plate 204 by the wall 212 and may have a generally centrally located aperture 214. The wall 213 may be downwardly bent about the aperture 214 to form the generally cylindrical wall or skirt 215.

Held between the plate 204 and the bottom wall 213 of the housing 210 is a ball-retaining, inverted cup-like member 220. This ball-guiding or ball cage member 220 may have the generally outwardly extending annular flange 221 surrounding the lower edge of its side wall 222, and the flange 221 may seat upon the bottom wall 213 of the housing 210 adjacent the side wall 212 of the housing 210. The wall 222 of the inverted cup 220 may be upwardly, inwardly inclined, and may have the inwardly bent upper edge portion 223 defining an opening, the diameter of which is substantially equal to the outer diameter of the keeper-guiding ring or downwardly bent edge 208 of the keeper-directing element 206.

Figure 17:
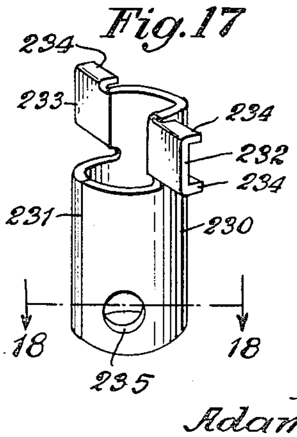
Figure 17 is a detail view of a moving part employed in my invention.

As shown in Figure 10, the inner edge of the cup portion 223 may abut the outer circumferential surface of the element 208, and the top surface of the portion 223 may abut the under face of the surface 207. A sleeve-like member 230 may be slidably mounted within the boss or skirt 215 and may have a portion extending within the hollow cup member 220. The ball-retaining sleeve 230 is shown in detail in Figure 17. The sleeve 230 may be easily and simply formed of one piece of metal by bending the metal upon itself to form the generally hollow, cylindrical member illustrated in the drawings, the opposite end edge portions of the metal sheet abutting to form a generally longitudinal seam as indicated at 231.

An end portion of the cylindrical sleeve thus formed may be slotted and the opposed edges rearwardly bent to form the oppositely-directed, outwardly-extending ears 232, 233. For the purposes of strength the ears 232, 233 may have their upper and lower edges inwardly bent, as indicated at 234.

Figure 18:
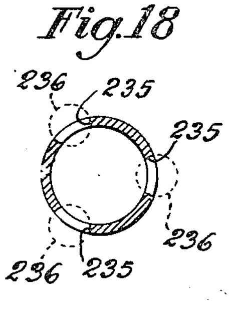
Figure 18 is a view taken on a line 18—18 of Figure 17.

Adjacent the opposite end of the sleeve 230, the wall thereof may be apertured as indicated at 235. For purposes of illustration, three such apertures are shown as being circumferentially spaced in the cylindrical wall of the sleeve 230. As best seen in Figure 18, the walls defining the aperture of 235 may be generally concave, the diameter of the aperture 235 being somewhat less than the diameter of the balls 236 shown in dotted lines in Figure 18.

It will be understood, as above described with relation to Figures 1–9, that the balls 236 are thus enabled to penetrate the apertures 235, allowing a small portion of the balls 236 to enter the area within the sleeve 230, a large portion of each of the balls 236 being held outside the sleeve 230 by the restricted diameters of the apertures 235.

As best seen in Figure 10, the internal diameter of the sleeve 230 may be substantially equal to that of the aperture 205 and only slightly greater than the diameter of the keeper 200. As best seen in Figure 10, also, the outer wall of the sleeve 230 and the inner surface of the wall 222 of the ball guide 220 form a converging area occupied by the balls 236, the upper width of said area being substantially less than the diameter of the balls 236, the lower width being sufficient to permit the balls 236 to move in a direction away from the apertures 235 a distance sufficient to take the balls 236 completely out of the area within the sleeve 230 and thus out of contact with the keeper 200.

It will be realized that the ears 232, 233 of the sleeve 230 are positioned outside of the cylindrical sleeve boss 215. Downwardly depending from the wall 213 of the housing 210 is a support 240 on which is pivotally mounted as at 241 a latch-actuating element 242. The element 242 may have adjacent its outer end a manually-engageable portion 243.

Downwardly depending from the support 230 at a point remote from the pivot point 241 is an ear 245. Similarly, depending from the lever 242 adjacent the pivot 241 is an ear 244. Secured at its opposite ends to the ears 244, 245 is the spring 246. The actuating element 242 has, opposite the pivot 41 from the portion 243, a slot 247 loosely surrounding one of the ears 232, 233 of the sleeve 230. The actuating element or lever 242 may be bent upon itself about the sleeve 230, as indicated generally at 248, and may have its terminal end formed in the manner of a yoke 249, the upper and lower arms of which loosely engage the upper and lower edges of the other ear on the sleeve 230.

In Figures 12–16 I illustrate another variant form of my invention. In the form of Figures 12–16 the keeper 200 is illustrated as being secured, as by the securing means 250, directly to the hood of an automobile and the keeper-retaining or latch structure as being secured to the hood closure. It will be realized that these elements could be reversed in location without departing from the nature and scope of my invention.

Figure 14:
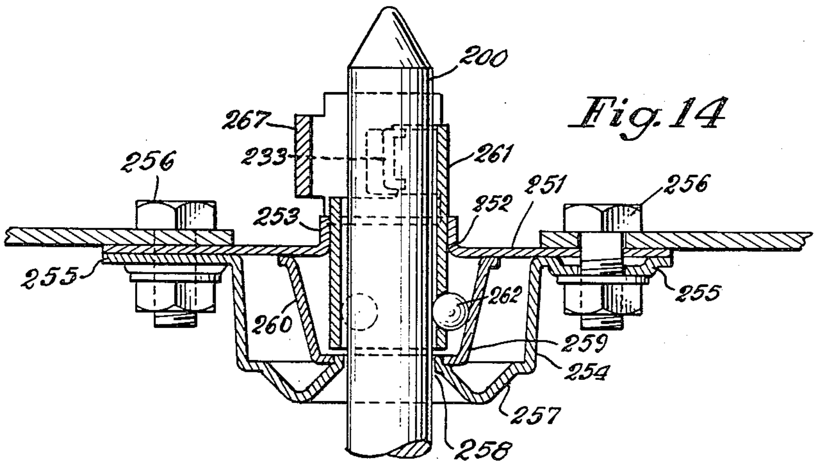
Figure 14 is a view taken on a line 14—14 of Figure 13.
Figure 16:
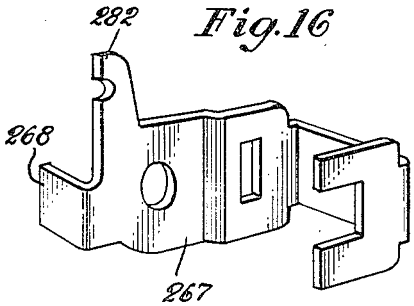
Figure 16 is a detail view illustrating one form of an actuating lever employed with my invention.

As, perhaps, is best seen in Figure 14, I illustrate a plate member 251 having a generally central aperture 252 which is in turn surrounded and defined by a cylindrical upstanding wall 253. Secured to the plate underface, as the parts are shown in the drawings, or in other words to the face of the plate 251 which is approached by the keeper as it moves toward latching position, is a bowl-like member or housing 254. The housing 254 has oppositely, outwardly extending flanges 255 which may be secured to the plate 251 as by the securing means 256. A bottom wall 257 of the housing 254 may be upset to form the keeper-guiding structure described above with relation to the plate 204, about the keeper-receiving aperture 258.

Retained between the bottom wall 257 of the housing 254 and the plate 251 is the outer ball race member or cup-shaped ball guide 259 having its downwardly, inwardly-inclined, generally conical side wall 260. This hollow cone member 259 surrounds the sleeve 261 and encases balls 262, the latter elements corresponding to sleeve 230 and balls 236, described above.

The plate 251 may have upwardly extending from one side edge thereof the supporting wall 265 on the inner face of which may be pivotally mounted, as at 266, a lever member generally indicated as 267. The lever member 267 is shown in detail in Figure 16 and corresponds generally to the right-hand portion of the actuating element 242 described in relation to Figure 10. Beyond the pivot point 266 from the sleeve-contacting portion of the element 267, however, the element has merely a perpendicular outwardly extending abutment portion 268 located adjacent pivot point 266.

Pivotally mounted on the opposite or outer face of the supporting wall 265 is a latch actuating arm generally indicated by the numeral 270. The arm 270 may be pivoted about the same axis as that of lever 267 as shown generally at 271. The arm 270 may have at one end, adjacent pivot point 271, an abutment portion 272 positioned to overlie or contact the abutment 268 on the lever 267. The cup-shaped latch housing 254 may have extending therefrom, in a generally horizontal plane, a portion 273 which may have the rectangular slot 274 loosely surrounding the lever arm 270 at a point intermediate its ends. A spring 275 may be connected at one end to the latch housing 254 and at its opposite end to the lever arm 270 at a point adjacent the slotted housing portion 273.

Adjacent the lower or outer end of the actuating arm 270, and perhaps integral therewith, is a rearwardly directed safety hook portion 276. The automobile hood portion to which the keeper 200 is secured may have a forward edge 277 downwardly inclined and the hook 276 may be upwardly, rearwardly inclined whereby the hook 276 is forced outwardly as it contacts the element 277, the spring 275 being effective to draw the safety hook portion 276 beneath the element 277 once it has passed therebeyond. The actuating arm 270 has at its lower or outer end an arcuate, manually-engageable portion 278.

It will be clear that, as the operator grasps portion 278 and lifts, safety hook 276 will be rotated clockwise out of alignment with the hood elements 277, the abutment 272 will contact the abutment 268 and will rotate it to lift the sleeve 261 to release the latching engagement of the balls 262 against the keeper 200, and, since the slot 274 acts as a limit or stop means for the movement of the actuating arm 270, continued upward pressure against the manually engageable portion 278 will bring the actuating arm 270 into contact with the plate element 273 which is attached to the hood closure and will thus result in the raising of the hood closure.

The spring 280 is connected to the support 265, as at 281, and to an ear 282 on the lever 267 to urge the lever 267 into non-actuating position, and thus to urge the sleeve 261 and balls 262 into position to receive and retain the keeper 200.

It will be realized that whereas I have described and shown a practical and operative device, nevertheless many changes may be made in size, shape, number and disposition of parts without departing from the spirit of my invention. I therefore wish my description and drawings to be taken as in a broad sense illustrative or diagrammatic rather than as limiting me to my precise showing herein.

The use and operation of my invention are as follows:

I provide a hood latch assembly which is particularly free of the need for precise adjustment. A simple cylindrical keeper 6 may be utilized and the hood closure 2 may be held in a variety of positions by the latching balls 60. As the hood closure 2 approaches the hood 1 the conical end 15 of the keeper 6 is brought into general alignment with the aperture 21 in the plate 20. If the keeper is not in precise alignment with the aperture 21, fore and aft, the end 15 of the keeper 6 will ride along the inwardly and downwardly inclined walls of the upset portion 22 and thus the circular or body portion of the keeper 6 will, when it reaches the aperture 21, be in alignment therewith. The keeper 6 is free to move through the aperture 21 and the sleeve 45, whatever distance is necessary to bring the hood closure 2 into desired position on the hood 1. Undesired upward movement thereafter of the keeper 6 tends to pinch the balls 60 between the keeper 6 and the upwardly, inwardly inclined wall 42 of the ring 40 and thus tends to grip the keeper 6 even tighter in position.

The sleeve 45 is, in fact, a ball-retaining and ball-actuating member. When the operator desires to release the latch in order to separate the hood closure 2 and the hood 1, he need only grasp the portion 92 of the operating lever and safety latch 91 and move it generally upward. As illustrated in dotted lines in Figure 2, the arm 93 may be raised upwardly a distance sufficient to cause rotation of the safety latch arm 98 and hook 100 out of latching engagement with the portion 101 before the arm 93 is brought into contact with the abutment 75. Continued upward movement of the arm 93, after the safety latch has been moved out of latching position, causes the arm 93 to carry the abutment 75 upward with it. Upward movement of the portion 75 causes a corresponding downward movement of the arms 68, 69 and thus a downward movement of the sleeve 45, which is operatively connected therewith. As the sleeve or ball cage member 65 is thus moved downwardly, it carries with it the balls 60. After the balls 60 are brought downwardly along the downwardly outwardly inclined wall 42 of the ring 40, the balls 60 are thus freed of pressure against the keeper 6 and are generally loosely held, as indicated in Figure 6, by the sleeve 45, the bottom wall 32 and the ring 40. Having been released of the pressure of the balls, the keeper 6 is free to move, under the influence of the spring 8, upwardly through and outwardly from the aperture 21 in the plate 20. When the operator releases upward pressure on the arm 93, the spring 96 is effective to urge the arm 93 downwardly and the safety latch 98, 100 forwardly into latching position and the spring 80 is effective to urge the arms 68, 69 upwardly, which, in turn, carry the sleeve 45 upwardly into latching position once more.

The operation of the form illustrated in Figure 8 is essentially that described above.

The operation of the devices illustrated in Figures 10–18 is also similar to that described above. In addition, I provide a hollow, cup-shaped, generally frusto-conical ball-guiding member which may be clamped between a housing and latch plate. The plate or the housing may have an upset portion surrounding the keeper-receiving aperture to direct or guide a keeper, which may be slightly out of adjustment and therefore out of alignment, toward the aperture. I provide a simplified ball-retaining sleeve formed in a particular manner and a particular means for actuating it to release the gripping action of the balls against the keeper, the inner diameter of the sleeve being substantially that of the keeper. I also provide the unitary safety latch and main latch-actuating member 270 which is effective, also, to serve as a lifting means for the hood closure with which it is associated.

I claim:

1. In a latch assembly for automobiles and the like, a latch plate, an aperture in said latch plate, a skirt surrounding said aperture and extending from said latch plate in one direction, said skirt having an internal diameter substantially equal to the diameter of said aperture, a hollow cylindrical sleeve movably mounted in said aperture, the outside diameter of said sleeve being substantially equal to the inside diameter of said aperture and said skirt, said sleeve being mounted for movement paralleling its longitudinal axis, a generally frusto-conical ring having its base positioned against the opposite face of said plate from the face from which said skirt extends, means for holding said ring base against said plate surface, said ring being positioned in axial alignment with said aperture, said skirt and said sleeve, said ring having its wall converging in a direction away from said last named plate surface and supporting a portion of said sleeve, said sleeve having a plurality of apertures in said last named sleeve portion, a ball member mounted in each of said apertures in said sleeve portion, the diameter of said sleeve apertures being less than the diameter of said ball members but being sufficient to permit a portion of said ball members to extend therethrough to contact said keeper when said keeper is within said sleeve, the radius of the area of said ring at its base being greater than the combined radius of said keeper and the diameter of one of said ball members, the radius of the area within said ring at its opposite end being less than the combined radius of said keeper and diameter of one of said ball members whereby withdrawal of said keeper from said sleeve frictionally moves said ball members along said ring toward said opposite ring end to urge said balls inwardly against said keeper to prevent further withdrawal thereof, the combined radius of said sleeve and said skirt being less than the combined radius of said sleeve and the diameter of one of said ball members whereby said ball members are effective to prevent movement of said sleeve outwardly through said plate aperture and said skirt and release means for said latch assembly including a lever pivotally mounted on said latch plate and having a lost motion connection with said sleeve and means for moving said lever to urge said sleeve in a direction outwardly through said plate aperture and said skirt to move said ball members toward said plate and toward ring base.

2. In a latch assembly for vehicles and the like, a latch plate, an aperture in said latch plate, a hollow cylindrical tubular sleeve movably mounted in said aperture and having an outside diameter substantially equal to the diameter of said aperture, said sleeve having a portion extending from one side of said plate and a portion extending from the other side of said plate, a generally frusto-conical ring surrounding one of said sleeve portions, a plurality of apertures in said last named sleeve portion, a ball member in each of said apertures, the diameter of said aperture being less than the diameter of said ball members but sufficient to permit a portion of said ball members to extend through the wall of said sleeve, an elongated, cylindrical rod-like keeper member having an outside diameter only slightly less than the inside diameter of said sleeve, said ring having its base adjacent said plate and having its wall converging therefrom toward the axis of said plate aperture, the radius of the area within said ring at its base being greater than the combined radius of said keeper and diameter of one of said ball members, the radius of the area within said ring at its opposite end being less than the combined radius of said keeper and diameter of one of said ball members, the radius of said plate aperture being less than the combined radius of said sleeve and the diameter of one of said ball members whereby said ball members are effective to prevent removal of said sleeve outwardly through said plate aperture in a direction away from said ring, the radius of the area within said ring at its base being less than the combined radius of said sleeve and one of said ball members whereby said ring is effective to hold said ball members in engagement with the apertures in said sleeve at all positions of said sleeve.

3. In a latch assembly for vehicles and the like, a housing, a pair of aligned apertures in opposed walls of said housing, a hollow tubular sleeve movably mounted in the aperture in one of said walls and having a portion extending within said housing and another portion extending outside said housing, a ring positioned within said housing and held therewithin by said opposed walls, said ring surrounding said sleeve portion within said housing, said ring having a converging generally frusto-conical inner wall surface, said ring wall surface converging toward the aperture in the other of said housing walls, an elongated cylindrical keeper adapted to enter the aperture in said other wall and to pass through said sleeve, said sleeve portion within said housing having a plurality of apertures in its wall, a ball member in each of said sleeve apertures, the diameter of said sleeve wall apertures being less than the diameter of said ball member, the diameter of said sleeve wall apertures being sufficient to permit a portion of said ball members to extend inwardly through said sleeve wall to contact said keeper, said inner ring wall being effective at one end to urge said ball members through said sleeve wall apertures into contact with said keeper and at the other end to permit said ball member to move outwardly from said sleeve a distance sufficient to permit withdrawal of said keeper from said sleeve, said ring being effective to maintain said ball member in contact with said sleeve at all positions thereof, said ball members being effective to prevent removal of said sleeve from said housing.

4. The structure of claim 3 characterized by and including projections on the outer end of said sleeve outside said housing and a lever member pivotally mounted adjacent said housing and having a portion in operable engagement with said projections on opposite sides of said sleeve and means for actuating said lever to move said sleeve in a direction paralleling its axis and the common axis of the apertures in said housing wall.

References Cited in the file of this patent

UNITED STATES PATENTS

| | | |
|---|---|---|
| 2,302,957 | Rhodes | Nov. 24, 1942 |

FOREIGN PATENTS

| | | |
|---|---|---|
| 693,341 | Great Britain | June 24, 1953 |
| 700,057 | France | Feb. 24, 1931 |
| 726,363 | France | May 27, 1932 |